April 18, 1961 M. C. A. FOURCADE 2,980,910
AIRCRAFT AERIAL FOR DECAMETRIC-WAVES
Filed Aug. 16, 1957 3 Sheets-Sheet 1
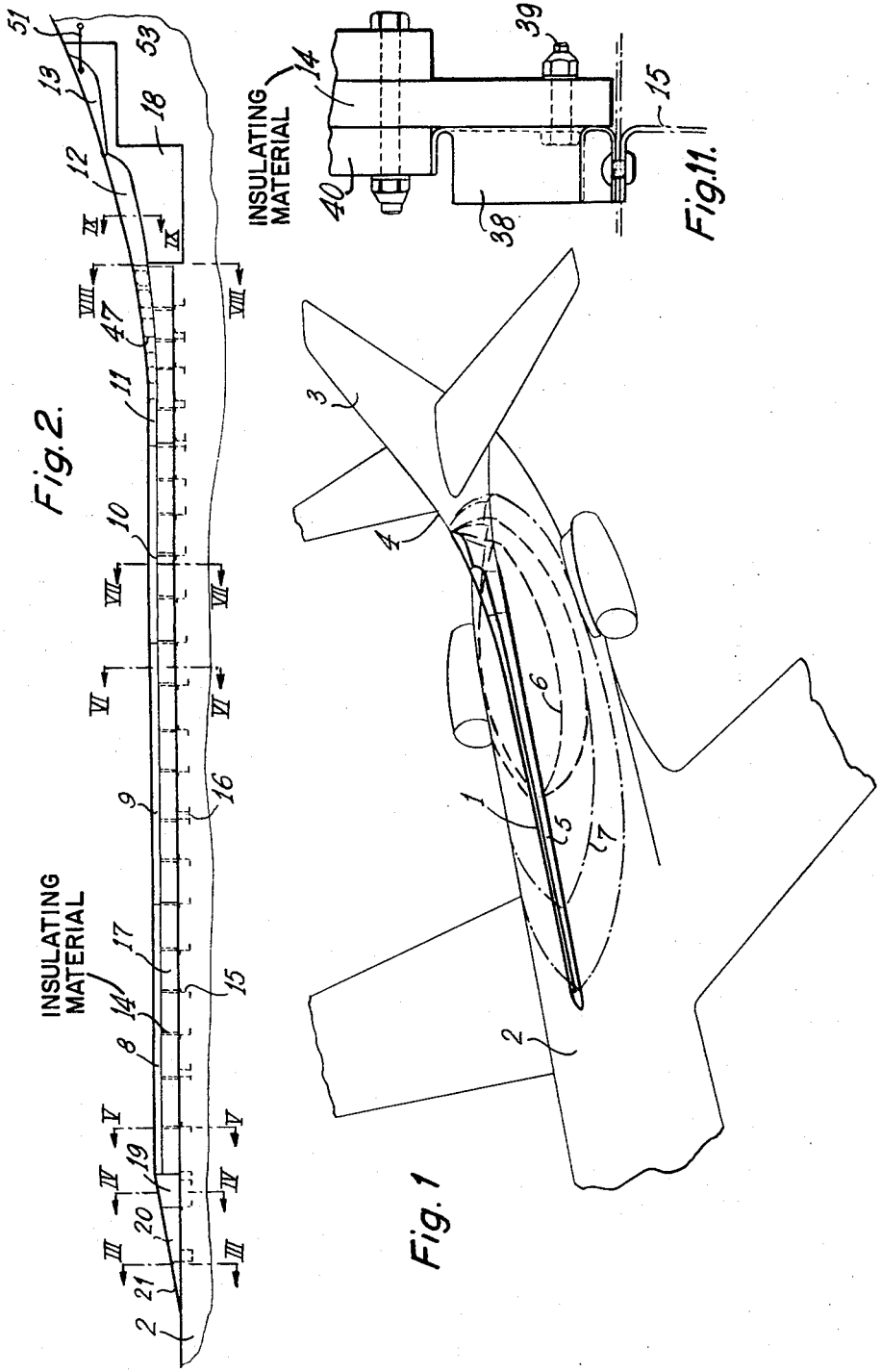

April 18, 1961  M. C. A. FOURCADE  2,980,910
AIRCRAFT AERIAL FOR DECAMETRIC-WAVES
Filed Aug. 16, 1957  3 Sheets-Sheet 2
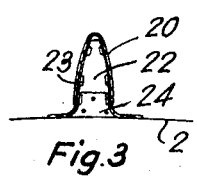
Fig.3
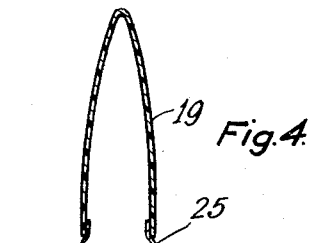
Fig.4
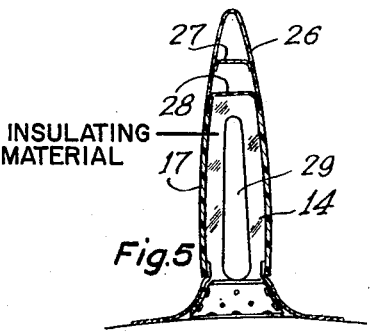
Fig.5
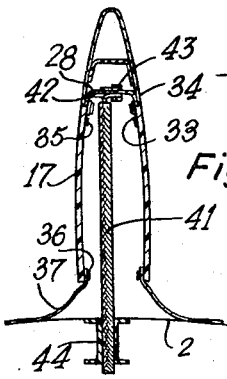
Fig.6
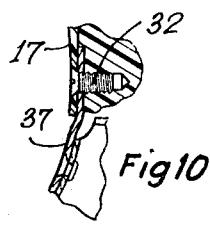
Fig.10
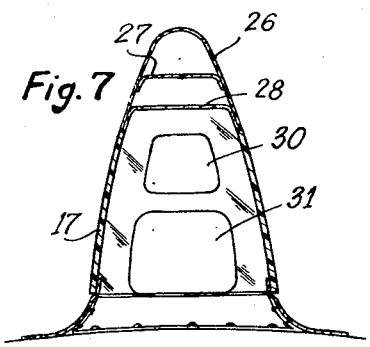
Fig.7
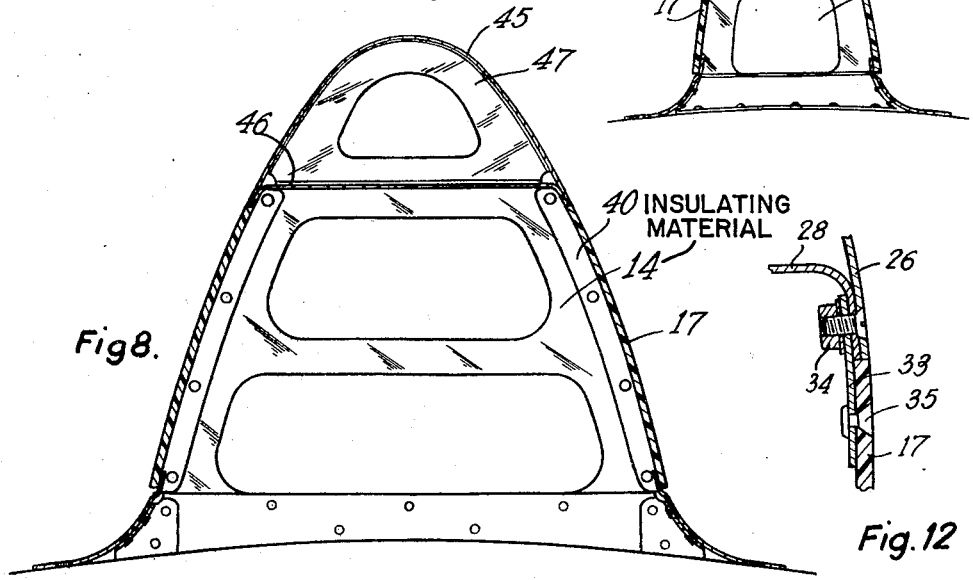
Fig.8
Fig.12
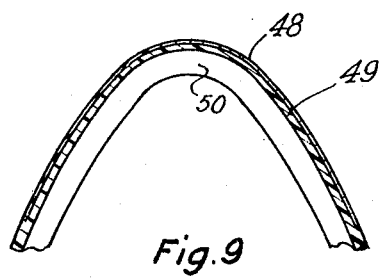
Fig.9

April 18, 1961  M. C. A. FOURCADE  2,980,910
AIRCRAFT AERIAL FOR DECAMETRIC-WAVES
Filed Aug. 16, 1957  3 Sheets-Sheet 3

United States Patent Office 2,980,910
Patented Apr. 18, 1961

2,980,910

AIRCRAFT AERIAL FOR DECAMETRIC-WAVES

Marc Camille Alexandre Fourcade, Toulouse, France, assignor to Sud-Aviation Societe Nationale de Constructions Aeronautiques, Paris, France Filed Aug. 16, 1957, Ser. No. 678,668

Claims priority, application France Nov. 14, 1956

6 Claims. (Cl. 343—705)

The present invention relates to improvements in aircraft aerials for decametric waves, also called HF-aerials, utilized in radio-electric aircraft systems operating in the high-frequency range, that is in the frequency band from 2 to 25 mc./s. and corresponding to wavelengths ranging from 150 to 12 metres.

As a rule, aerials operating in the HF band are of the outboard type. Initially, these aerials consisted of wires of a length ranging from about one-hundred to three-hundred feet, which were suspended under the aircraft during flights and retracted during landings.

Then, as the size of aircraft increased it became possible to construct fixed outboard aerials extending in general from a small post above the fuselage to the rear and having their other ends being secured on the top of the tail fin or fins.

Now the use of aerials of this general character is attended at very high speeds by serious problems of aerodynamic mechanical order, notably in connection with their strength, anchorage and resistance to the vibration developing under flying conditions. Moreover, their increasing drag involved a substantial reduction in the aircraft performances.

HF aerials have also been constructed in the form of a horizontal tube mounted in a direction substantially parallel to the aircraft axis of flight on the top of a fin and pointed forwards. However, the overhanging resistance of these aerials constitutes a serious drawback and in addition vibration is sustained under flying conditions; besides, no grounding is possible and the point effect renders this type of aerial highly responsive to lightning.

The higher and higher speeds of modern aircraft make it a must to "embed" the aerials in the aircraft structure. Thus, in the field of HF-aerials these have also been constructed in the form of rectilinear tubes mounted inside the wing-section, notably in the leading edge, which were enclosed in suitable elements of insulating material covered by a fairing reconstituting the airfoil sectional shape.

Other embedded or recessed aerials of the so-called loop type have been constructed which consisted of a coil made of several turns of relatively thin copper tubing; this coil was mounted in the region of the fairing fillet between the front portion of the tail fin and the fuselage, and was usually covered by a glass-reinforced insulating sheath of plastic material of such external shape as to conveniently merge in the streamline shape of this region.

These loop aerials are generally satisfactory as far as the aerodynamic requirements are concerned, but unfortunately they develop local currents which are very difficult to control. The secondary currents developing on the aircraft surface and forming closed loops thereon are thus limited and the radiation is inefficient.

In order to avoid the various drawbacks broadly set forth hereabove which characterize HF aerials of the types proposed heretofore, while ensuring an efficient radiation of the radio-electric waves on the aircraft surface, it is the essential object of this invention to provide an improved aircraft HF-aerial for radio systems operating on decametric wavebands, which is both embedded and structural and consists of a rigid metal element of elongated and streamlined shape, disposed longitudinally somewhat in the fashion of a dorsal fin along at least one portion of the upper longitudinal rear zone of the aircraft structure, in the plane of symmetry thereof, on a streamlined longitudinal insulating support ensuring a proper continuity in the fair-shaped sections between these metal elements and in the aircraft structure. The metal element and its support extend preferably along at least one portion of the upper longitudinal rear zone of the fuselage and in the plane of symmetry thereof, along the fairing fillet of the tail fin corresponding to this fuselage and also along a more or less important fraction of the leading edge of this tail fin.

The aforesaid metal element may consist of an open section, a closed section or, according to its size, of an assembly of open and/or closed sections.

The aforesaid longitudinal insulating support may advantageously consist of a plurality of elements of insulating material comprising transverse supports secured directly or through the medium of metal brackets or the like on structural frames of the fuselage, as well as longitudinal panels of insulating material which are carried by said supports for properly connecting the aerial section to the fin and fuselage sections.

Other features and advantages of the present invention will appear as the following description proceeds with references to the accompanying drawings forming part of this specification and illustrating diagrammatically by way of example the manner in which the invention may be carried out in the practice. In the drawings:

Fig. 1 is a diagrammatic isometric view showing an aircraft equipped with a HF-aerial constructed according to the teachings of the invention.

Fig. 2 is a diagrammatic longitudinal section showing on a larger scale the aerial equipping the aircraft of Fig. 1.

Figs. 3 to 9 are sections taken across Fig. 2 in the planes III—III, IV—IV, V—V, VI—VI, VII—VII, VIII—VIII and IX—IX, respectively.

Fig. 10 is a cross-sectional view showing on a larger scale the mounting of a longitudinal panel of insulating material on a transverse support also of insulating material.

Fig. 11 illustrates the manner in which a panel of insulating material is mounted on a structural frame member of the aircraft.

Fig. 12 shows on a larger scale the mounting of the metal element of the aerial on a panel of insulating material.

Figure 13:
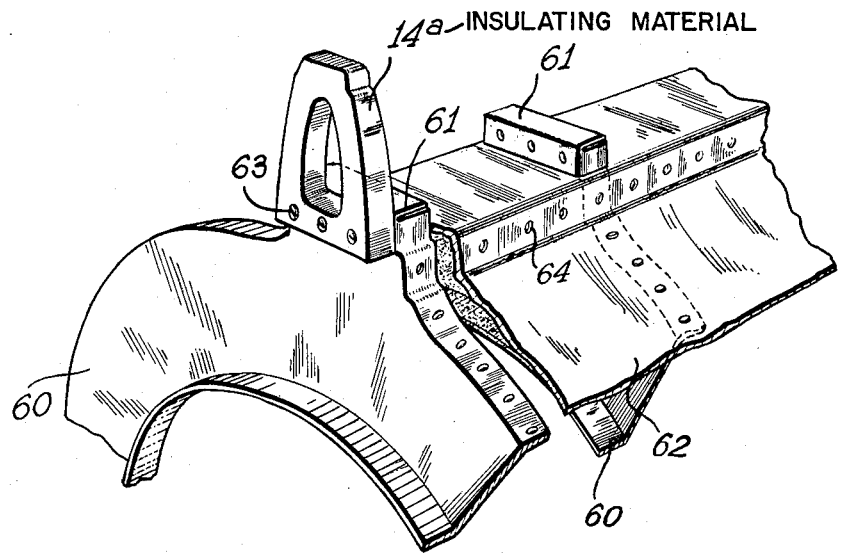
Fig. 13 shows on a larger scale the mounting of an element of insulating material on an extension of a transverse frame.

The aerial illustrated in Fig. 1 comprises a rigid metal element 1 of elongated and streamlined shape, disposed longitudinally in the fashion of a dorsal fin on the top of the aircraft fuselage 2, along one portion of the rear zone of this fuselage, of the fairing fillet connecting this fuselage 2 with the tail fin 3, and of one fraction of the leading edge 4 of this tail fin 3. This metal element 1 is secured on an insulating support 5 connecting this element with the fuselage and the tail fin. This metal element is grounded at its rear end by means of a cable 51 and provided with a central aerial plug or terminal connected to a feeding cable 41. The aerial thus defined in its broadest aspect is of the semi-directional type and its polarization has a horizontal main component.

The essential advantages deriving from an aerial of this general character are as follows:

(a) It has a low ohmic resistance due to its large-sectioned, volumetric shape;

(b) Its capacity is increased and therefore the quality of the communications is improved due to the compensation of the moderate effective height relative to the aircraft;

(c) The aerial portion disposed in front of the aerial connector or terminal has a greater efficiency and improves the reactance factor:

$$L\omega - \frac{1}{C\omega}$$

(d) The grounding of the rear portion and the excitation caused by the front portion provide an increase in the radiation capacity which results from the greater radiating surface of the aircraft itself due to the greater extent of the primary current lines 6 and secondary current lines 7 over the aircraft surface;

(e) For a given aircraft, the relative magnitude of the horizontal and vertical polarizations may be varied by construction either by more or less elongating the aerial in the froward direction on the fuselage, or by raising the aerial more or less up the tail fin;

(f) The rear grounding and the aerial dispositions are such that the effects of lightning are minimized;

(g) For a given aircraft, on the one hand, the dorsal fin thus added to the aircraft structure exerts a fin action improving the aerodynamic conditions of stability and, on the other hand, in the case of an aircraft to be designed the importance of the tail fin may be reduced due to the presence of this dorsal fin; finally, the metal element may contribute in increasing the strength of the structure by constituting a main stringer thereof.

In the typical embodiment of an aerial according to this invention, which is illustrated in Figs. 2 to 11 of the drawings, the rigid metal element consists of a plurality of closed-section elements 8, 9, 10 and 11, on the one hand, and of two open-section elements 12 and 13, on the other hand.

The longitudinal insulating support comprises in its portion overlying the top of the fuselage 2 a series of transverse brackets or supports 14 secured on medium-sized frames 15 or larged-sized frames 16 of the aircraft structure, and longitudinal panels 17 of insulating material secured on these supports 14 for properly connecting the aerial section to the fuselage section. This support, in the tail-fin portion thereof, consists of an inverted V-shaped member 18 of insulating material. At the front the support has an extension, on the one hand, in the form of a fairing 19 of insulating material and, on the other hand, in the form of two metal fairings 20, 21. The upper ends of said supports 14 and panels 17 are disposed at a lower level than the adjacent parts of the edges of member 18 and fairing 19.

As illustrated in cross-section in Fig. 3, just behind the connection or junction between the two fairings 20 and 21, the fairing 20 has a streamlined shape and is connected to the fairing 21 by means of a fitting or fish-plate 22 and secured by countersunk-head screws and nuts 23 locked internally on this fairing 20, the latter being mounted in turn on a support 24 secured on the fuselage. In the cross-section of Fig. 4 the fairing 19 consists of a moulded piece of plastic insulating material which is secured by metal supports or fillets 25 on the fuselage structure 2.

As illustrated in Figs. 5 to 7, the aerial metal element, in the portion thereof undergoing only minor variations in its cross-sectional size, that is portions 8, 9 and 10, consists of a sheet-metal member 26 bent to an inverted-V shape and stiffened by means of two metal longitudinal members 27, 28 secured on this sheet-metal member by any suitable method, for example by welding. Thus, a closed section having a triangular cross-section is obtained.

This closed section bears by its base on supports or brackets 14 of insulating material which are provided with either a single lightening aperture 29 (Fig. 5) or two lightening apertures 30, 31 (Fig. 7). These different supports or brackets 14 are laterally interconnected by panels 17 of insulating material which are secured on these supports by means of screws 32 (Fig. 10), the closed section being secured in turn thereon by means of plates 33 (see Figs. 6 and 12), secured by countersunk-head screws and nuts 34 locked internally with this section and fastened with the panel 17 by gluing and riveting, as shown at 35. Preferably, the gluing operation is carried out by using an ethoxylic resin of the type known under the trade mark of "Araldite." The panels 17 are secured by means of countersunk-head screws and nuts 16 locked internally on metal supports 37 secured in turn on the fuselage structure. This fixation is obtained substantially in the plane of each frame 15 or 16 by means of one or two U-shaped gussets 38 (Fig. 11) secured by a bolt 39 on the relevant insulating support 14 provided with two lateral reinforcing members 40 adapted to increase the bearing surface of the panels 17.

In the section shown in Fig. 6 in the plane of the central aerial terminal or plug, an insulated cable 41 carrying an end thimble or eye-terminal 42 is secured on the longitudinal member 28 by means of a bolt 43. This cable extends through the aircraft structure across an insulating socket 44.

In the region where substantial changes in the cross-sectional shape of the aerial must be provided to comply with aerodynamic requirements (zone 11 of Fig. 2) the metal element consists of a sheet-metal element 45 bent to an inverted-V shape and provided with a longitudinal reinforcing member 46 to constitute a closed section of triangular prismatic configuration stiffened internally by a series of transverse ribs or supports 47 (Fig. 8). As in the case of the preceding figures, this metal element bears by its base on insulating supports 14 interconnected laterally by insulating panels 17.

Finally, in the zone where the metal element is subjected to substantial variations both in width and in height (zones 12 and 13 of Fig. 2), this metal element consists simply of a sheet-metal member 48 bent to an inverted V configuration (Fig. 9), glued and riveted on the inverted V-shaped member 18 of insulating material comprising a continuous lateral wall 49 and a plurality of internal reinforcements 50. The grounding is effected by means of a cable 51 (Fig. 2) connecting the rear section 13 of the aerial to the adjacent metal panels 53 covering the tail fin.

The upper edge of the closed sections of the metal element and the edge of the inverted V-shaped member 48 provide the desirable continuity of the edges of fairings 19, 20 and 21 and of the leading edge 4 of the tail fin 3.

The height of the metal element constituting the aerial proper or its active portion is calculated in relation to the total height by which this aerial emerges above the fuselage in order to avoid the production of any corona effect when the aircraft is flown in a rarefied atmosphere. In a typical embodiment of the invention this height may be substantially one-third of the total height.

In the embodiment shown in Fig. 13 instead of utilizing metal supports such as supports 37, the transverse ribs or frames 60 of the fuselage are formed with extensions 61 projecting over the fuselage skin 62 and on which are directly secured the supports 14a of insulating material by means of screws 63. The skin 62 is formed with threaded holes 64 for securing the panels of insulating material by means of screws.

Figure 14:
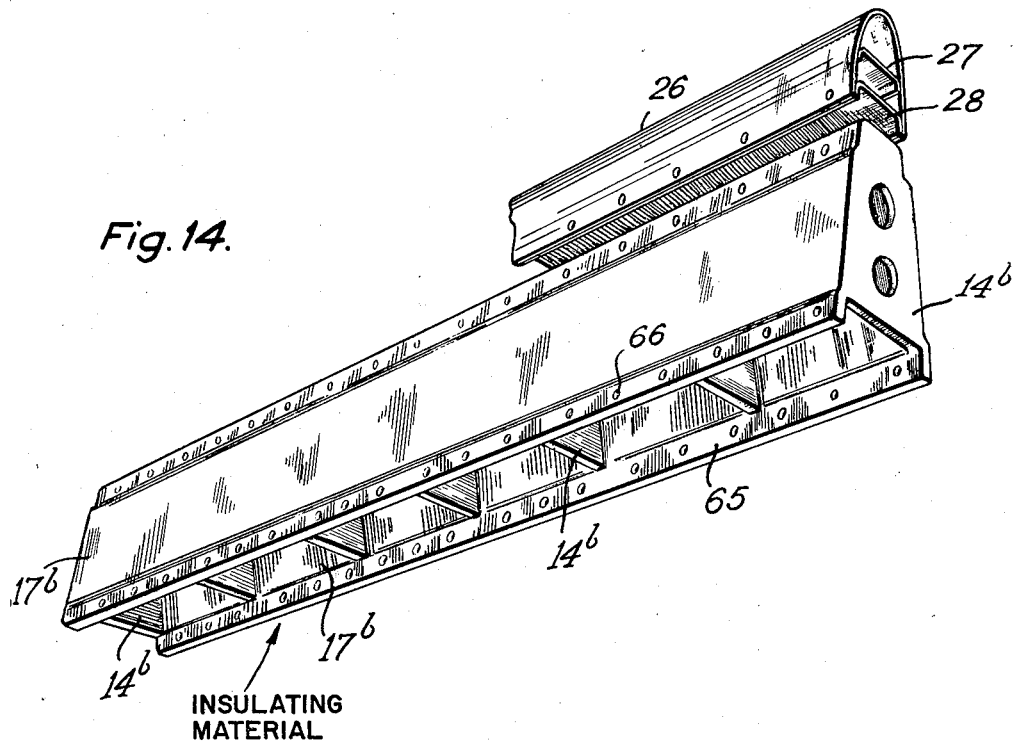
Fig. 14 is an isometric view from below of a plastic box-structure supporting the metal element of the aerial.

The plastic elements, supports and panels, constituting the insulating support may be constructed in the form of molded box-structures as illustrated in Fig. 14. In said molded box-structure the supports 14b are integral with the panels 17b and with longitudinal parts 65 formed with holes 66 utilized for the fixation of the box-structure either on metal supports such as supports 37 or on the skin of the fuselage. Thus the points of fixation of such box-structures on the fuselage may be less than in the case of separate elements.

Of course, many modifications and alterations may be brought to the arrangement described herein without departing from the scope of the invention as set forth in the appended claims. Thus, the metal element may consist wholly of an open-sectioned or closed-sectioned-element. Moreover, instead of being added to an existing structure, its location may be provided initially in the aircraft structure.

What I claim is:

1. In an aerial structurally incorporated into an aircraft, for operating at decametric waves and of the kind comprising a profiled longitudinal insulating support mounted on the structure of the aircraft and a metallic element secured on said support, grounded at its rear end and fed substantially in its center region, the aggregate of insulating support and metallic element being profiled to ensure continuity of shape between said aerial and said aircraft structure; the improvement according to which the profiled longitudinal insulating support is constituted by series of elements of insulating material comprising transverse supports fixed on the transverse structural ribs of aircraft fuselage and longitudinal panels of insulating material fixed on said transverse supports and ensuring the connection of the shapes of the aerial to those of the structure of the aircraft.

2. An aircraft HF-aerial, according to claim 1, wherein the transverse supports are directly secured on the structural frames of the fuselage.

3. An aircraft HF-aerial according to claim 1, further comprising metal supports interposed between the transverse supports and the structural frames of the fuselage.

4. An aircraft HF-aerial, according to claim 1, wherein the transverse supports are directly secured on extensions formed on the transverse frames of the fuselage.

5. An aircraft HF-aerial, according to claim 1, wherein the transverse supports and longitudinal panels of insulating material consist of a plastic material.

6. An aircraft HF-aerial, according to claim 1, wherein the panels are integral with the transverse supports for forming pre-fabricated box-structures.

References Cited in the file of this patent

UNITED STATES PATENTS

| | | |
|---|---|---|
| 2,181,327 | Guggenheim | Nov. 28, 1939 |
| 2,242,200 | Woods | May 13, 1941 |
| 2,503,109 | Harris | Apr. 4, 1950 |
| 2,659,004 | Libenblad | Nov. 10, 1953 |
| 2,758,300 | Dylewski | Aug. 7, 1956 |

FOREIGN PATENTS

| | | |
|---|---|---|
| 534,945 | Great Britain | Mar. 24, 1941 |
| 739,890 | Germany | Oct. 7, 1943 |

OTHER REFERENCES

Proceedings: Institution of Electrical Engineers, "A Survey of External and Suppressed Aircraft Aerials," by Cary, pp. 197–210, vol. 99, July 1952.

Designing Flush Antennas, March 1954, Electronics pp. 135–140.